(12) United States Patent
Garcia-Lopez

(10) Patent No.: US 9,279,672 B1
(45) Date of Patent: Mar. 8, 2016

(54) FLANGE BOLT ALIGNMENT SYSTEMS AND METHODS

(71) Applicant: Jose Jesus Garcia-Lopez, Shreveport, LA (US)

(72) Inventor: Jose Jesus Garcia-Lopez, Shreveport, LA (US)

( * ) Notice: Subject to any disclaimer, the term of this patent is extended or adjusted under 35 U.S.C. 154(b) by 0 days.

(21) Appl. No.: 14/488,861

(22) Filed: Sep. 17, 2014

(51) Int. Cl.
  *G01B 11/14* (2006.01)
  *G01B 11/27* (2006.01)
  *G01J 1/04* (2006.01)

(52) U.S. Cl.
  CPC ............. *G01B 11/272* (2013.01); *G01J 1/0407* (2013.01)

(58) Field of Classification Search
  CPC ......... B25B 27/00; B25B 23/00; F16L 23/00; Y10T 29/00; G02B 27/00; G02F 1/00; G03B 21/00
  USPC .................................. 356/399–401, 614–624
  See application file for complete search history.

(56) References Cited

U.S. PATENT DOCUMENTS

| | | | |
|---|---|---|---|
| 5,077,905 A | 1/1992 | Murray, Jr. | |
| 5,435,073 A * | 7/1995 | Sullivan | G01B 5/25 33/412 |
| 5,450,245 A | 9/1995 | Grotzinger et al. | |
| 5,590,474 A | 1/1997 | Lamb | |
| 5,686,996 A * | 11/1997 | Fidler | G01J 1/4257 356/234 |
| 5,920,999 A | 7/1999 | Hutter | |
| 6,915,582 B1 | 7/2005 | Engels | |
| 7,023,550 B2 * | 4/2006 | Chapman | F16C 11/106 356/399 |
| 7,845,084 B2 | 12/2010 | Statham | |
| 2002/0122178 A1 * | 9/2002 | McMurtry | G01B 11/272 356/401 |

* cited by examiner

*Primary Examiner* — Tarifur Chowdhury
*Assistant Examiner* — Isiaka Akanbi
(74) *Attorney, Agent, or Firm* — R. Keith Harrison

(57) ABSTRACT

A flange bolt alignment system has an emitting unit including a beam emitting assembly adapted to emit an incident light beam and a beam reflecting assembly having a pivoting beam reflecting element continually oriented along a vertical axis by gravity; and a light reflecting surface on the beam reflecting element, the light reflecting surface positioned to receive the incident light beam and reflect a reflected light beam along a horizontal axis; and a receiving unit adapted for positioning in adjacent, spaced-apart relationship to the emitting unit. A flange bolt alignment method is also disclosed.

21 Claims, 11 Drawing Sheets

FLANGE BOLT ALIGNMENT SYSTEMS AND METHODS

FIELD

Illustrative embodiments of the disclosure generally relate to conduits for pipelines and other fluid conveying systems. More particularly, illustrative embodiments of the disclosure relate to a flange bolt alignment systems and methods which facilitate alignment of bolt openings in the flanges of adjoining conduits to expedite bolting of the conduits to each other.

BACKGROUND

The background description provided herein is solely for the purpose of generally presenting the context of the illustrative embodiments of the disclosure. Aspects of the background description are neither expressly nor impliedly admitted as prior art against the claimed subject matter.

In the fabrication of pipelines used to convey fluids such as oil and gas, flanged pipeline conduits are connected to each other end-to-end. The flanges on each pipeline conduit typically include multiple bolt openings which are aligned with the bolt openings in the flanges of the adjacent pipeline conduits. Bolts are typically extended through the registering bolt openings and secured with nuts to attach the flanges and the adjacent conduits to each other.

One of the challenges commonly encountered in bolting adjacent pipeline conduits to each other is properly aligning the bolt openings in the flanges of the adjacent conduits with each other to facilitate extension of the bolts through the openings. Accordingly, flange bolt alignment systems and methods which facilitate alignment of bolt openings in the flanges of adjoining conduits to expedite bolting of the conduits to each other is needed.

SUMMARY

Illustrative embodiments of the disclosure are generally directed to flange bolt alignment systems which facilitate alignment of bolt openings in the flanges of adjoining conduits to expedite bolting of the conduits to each other. An illustrative embodiment of the flange bolt alignment systems has an emitting unit including an emitting unit housing; a beam emitting assembly in the emitting unit housing, the beam emitting assembly having a beam emitting device adapted to emit an incident light beam and at least one power source electrically connected to the beam emitting device; and a beam reflecting assembly in the emitting unit housing, the beam reflecting assembly having a beam reflecting element pivotally carried by the emitting unit housing and continually oriented along a vertical axis by gravity; and a light reflecting surface on the beam reflecting element, the light reflecting surface positioned to receive the incident light beam and reflect a reflected light beam from the emitting unit housing along a horizontal axis; and a receiving unit adapted for positioning in adjacent, spaced-apart relationship to the emitting unit, the receiving unit including a receiving unit housing and a light diffusing element in the receiving unit housing.

Illustrative embodiments of the disclosure are further generally directed to flange bolt alignment methods. An illustrative embodiment of the flange bolt alignment methods includes installing an emitting unit in a first bolt opening in a first flange of a first conduit; installing a receiving unit in a second bolt opening adjacent to the first bolt opening in the first flange of the first conduit; emitting a light beam from the emitting unit along a horizontal axis; adjusting a rotational position of the first conduit until the light beam impinges on the receiving unit; aligning a second conduit with the first conduit; installing a receiving unit in a first bolt opening in a second flange of the second conduit; installing a receiving unit in a second bolt opening adjacent to the first bolt opening in the second flange of the second conduit; emitting a light beam from the emitting unit along a horizontal axis; and adjusting a rotational position of the second conduit until the light beam impinges on the receiving unit.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front" and "rear" herein are used with reference to relative positions of various elements with respect to each other in exemplary application of the flange bolt alignment system and are not intended to be used in a limiting sense.

Figure 3:
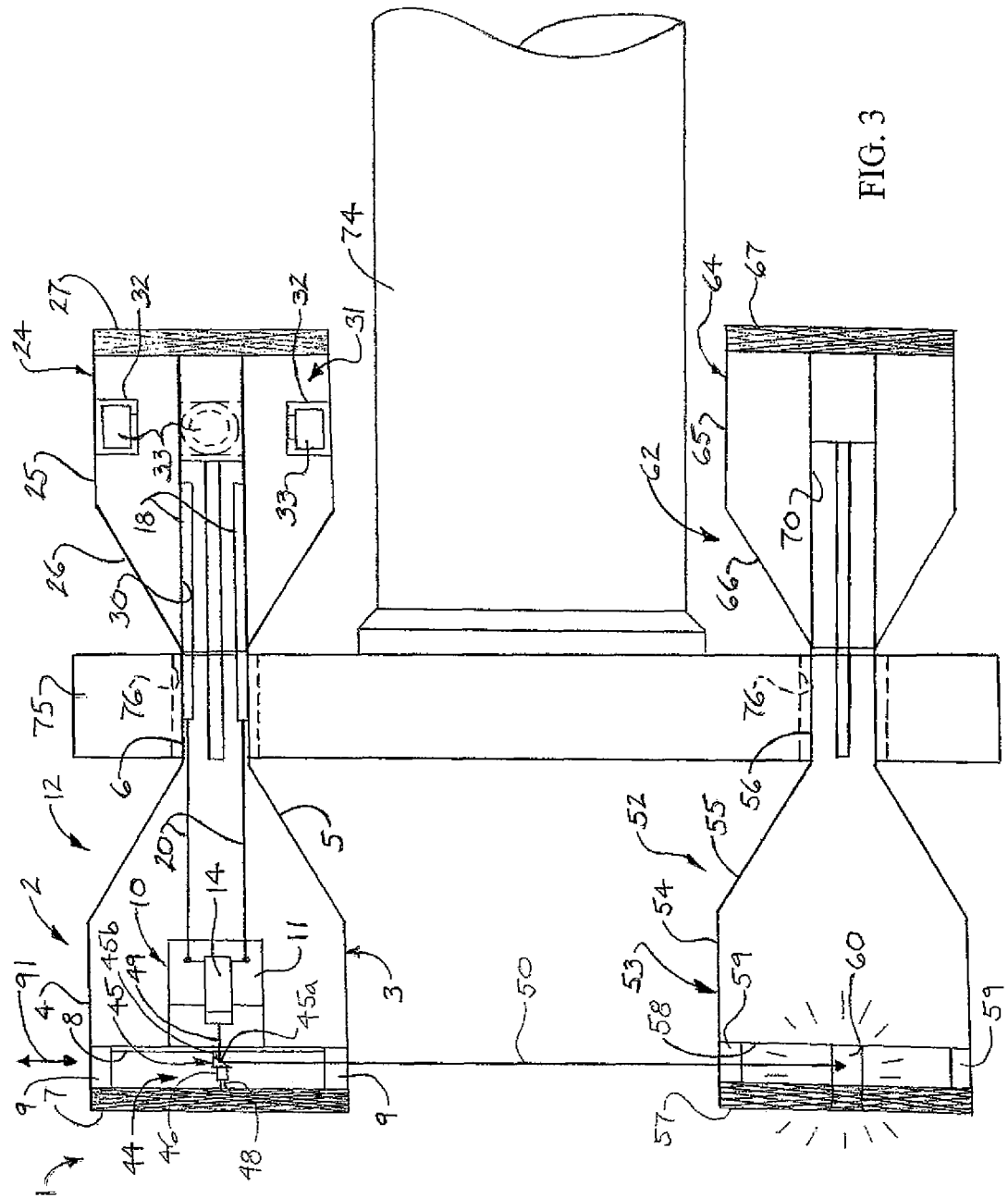
FIG. 3 is a top view of an illustrative embodiment of the flange bolt alignment systems in typical application of the systems.
Figure 3A:
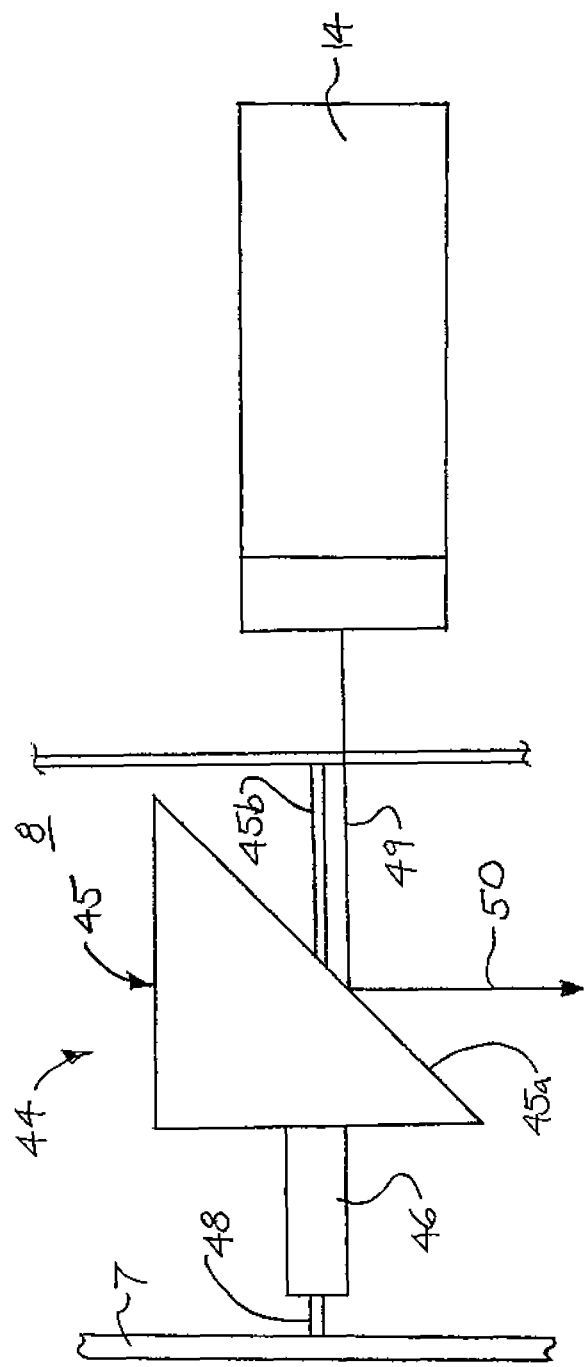
FIG. 3A is a top view of a typical beam reflecting assembly of an illustrative embodiment of the flange bolt alignment systems in typical application of the systems.
Figure 4:
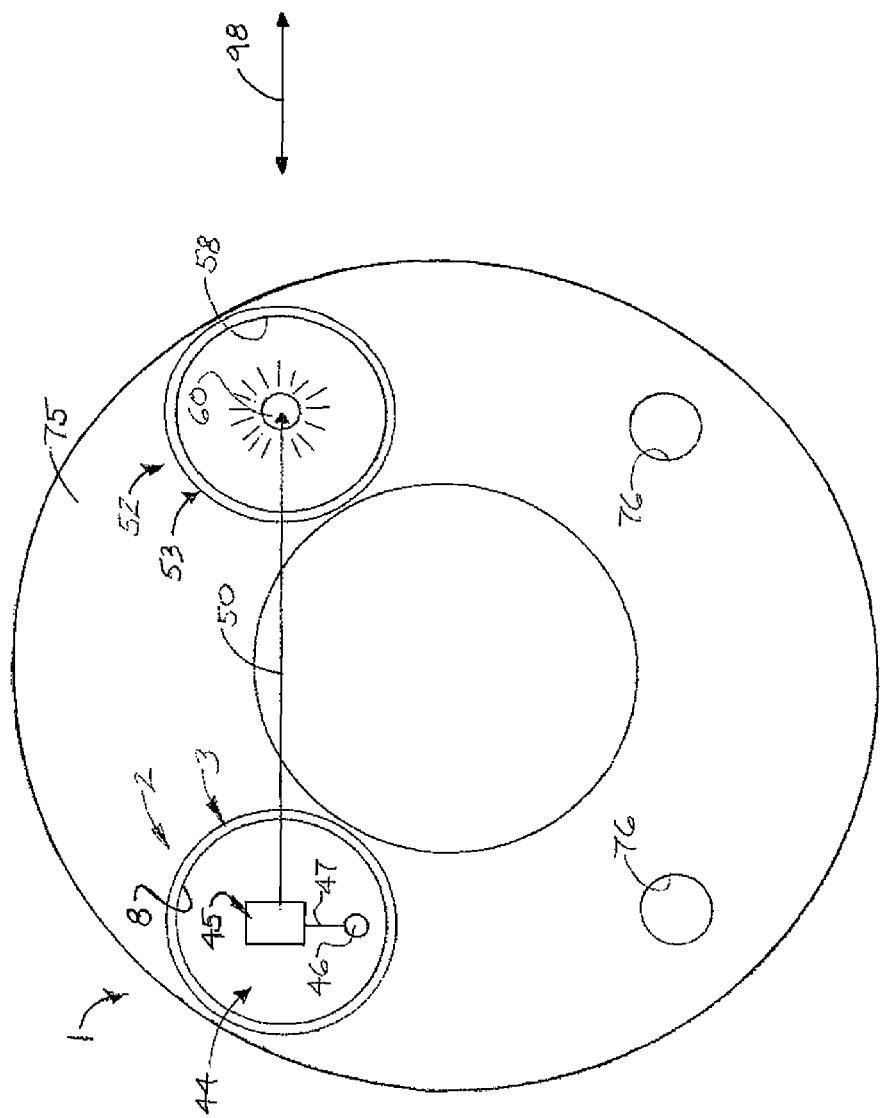
FIG. 4 is a front view of an illustrative embodiment of the flange bolt alignment systems in typical application of the systems, with a light beam from the emitting unit impinging on the receiving unit of the system to indicate proper horizontal orientation of a pair of bolt openings in a conduit flange.
Figure 5:
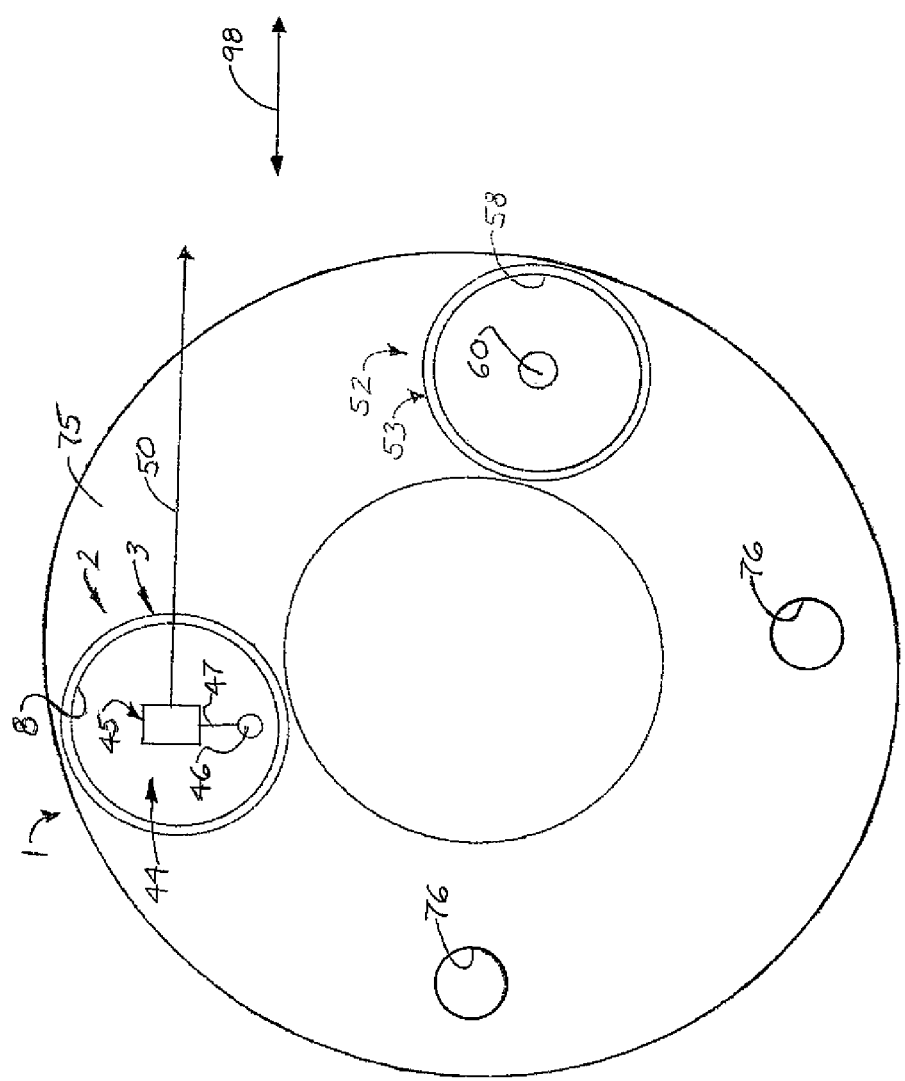
FIG. 5 is a front view of an illustrative embodiment of the flange bolt alignment systems in typical application of the systems, with the light beam from the emitting unit emitting beyond the receiving unit of the system to indicate improper orientation of the pair of bolt openings in the conduit flange.
Figure 7:
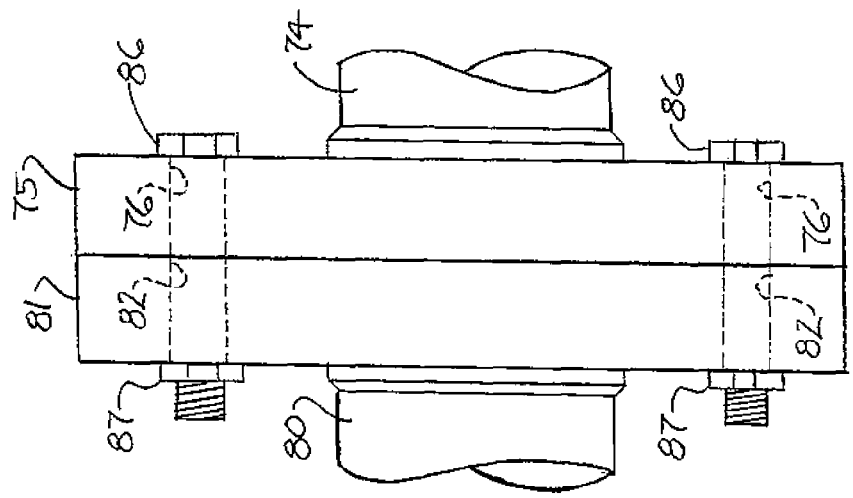
FIG. 7 is a side view with the conduit flanges on the adjacent conduits bolted to each other.
Figure 6:
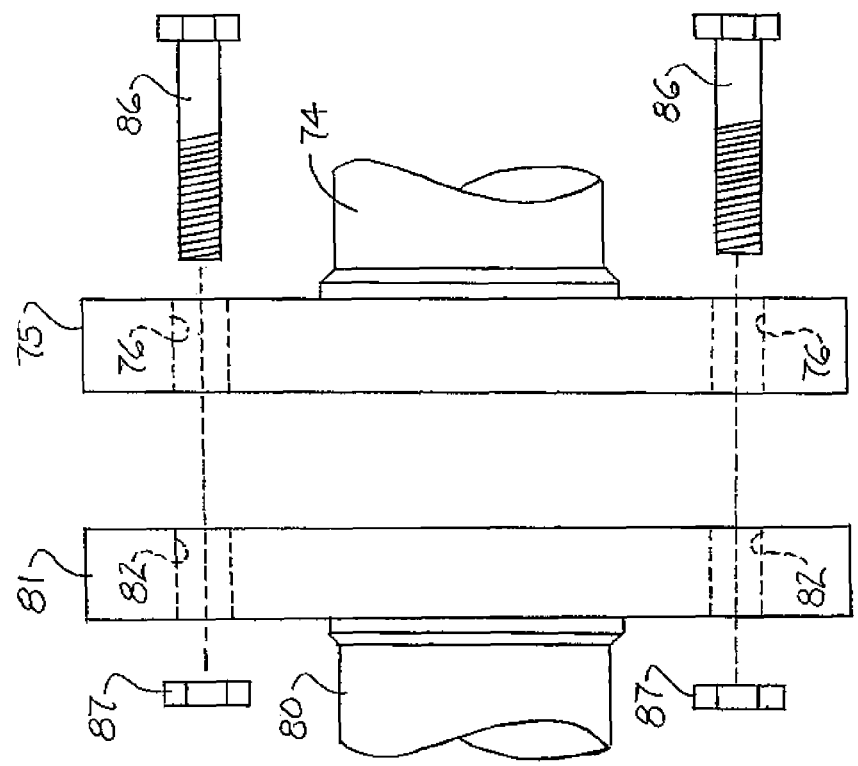
FIG. 6 is an exploded side view illustrating bolting of a pair of conduit flanges on adjacent conduits to each other after utilizing the flange bolt alignment system.

Referring initially to FIGS. 3-7 of the drawings, an illustrative embodiment of the flange bolt alignment systems, hereinafter system, is generally indicated by reference numeral 1 in FIG. 3. The system 1 includes an emitting unit 2 and a receiving unit 52 which is adapted for positioning in adjacent, spaced-apart relationship to the emitting unit 2 as will be hereinafter described. As illustrated in FIGS. 6 and 7, in typical application, which will be hereinafter described, the system 1 (FIG. 3) facilitates alignment of a first set of bolt openings 76 in a first conduit flange 75 on a first conduit 74 with a second set of bolt openings 82 in a second conduit flange 81 on a second conduit 80 for insertion of flange bolts 86 through the registering first and second sets of bolt openings 76, 82, respectively, and coupling of the second conduit 80 to the first conduit 74. As illustrated in FIG. 3, the emitting unit 2 and the receiving unit 52 may initially be inserted through an adjacent pair of the first set of bolt openings 76 in the first conduit flange 75 on the first conduit 74, after which the emitting unit 2 emits a reflected light beam 50. In the event that the adjacent pair of the first set of bolt openings 76 is properly disposed in a horizontal plane 98 (FIG. 4), the reflected light beam 50 is transmitted along a horizontal axis 91 (FIG. 3) and impinges on the receiving unit 52, as illustrated in FIGS. 3 and 4. Thus, the second conduit 80 (FIG. 6) can be oriented in like manner such that an adjacent pair of the second set of bolt openings 82 in the second conduit flange 81 on the second conduit 80 are oriented in the horizontal plane 98 and the second set of bolt openings 82 is properly aligned or registered with the first set of bolt openings 76 on the first conduit 74 to insert and secure flange bolts 86 in the first and second set of bolt openings 76, 82, respectively, and couple the second conduit 80 to the first conduit 74. In the event that the adjacent pair of the first set of bolt openings 76 is not properly disposed in the horizontal plane 98, the reflected light beam 50 misses the receiving unit 52, as illustrated in FIG. 5. Thus, adjustments in the orientation of the first conduit 74 can be made to position the adjacent pair of the first set of bolt openings 76 in the horizontal plane 98 for alignment of the second set of bolt openings 82 with the first set of bolt openings 76 and coupling of the second 80 to the first conduit 74.

Figures 1, 2:
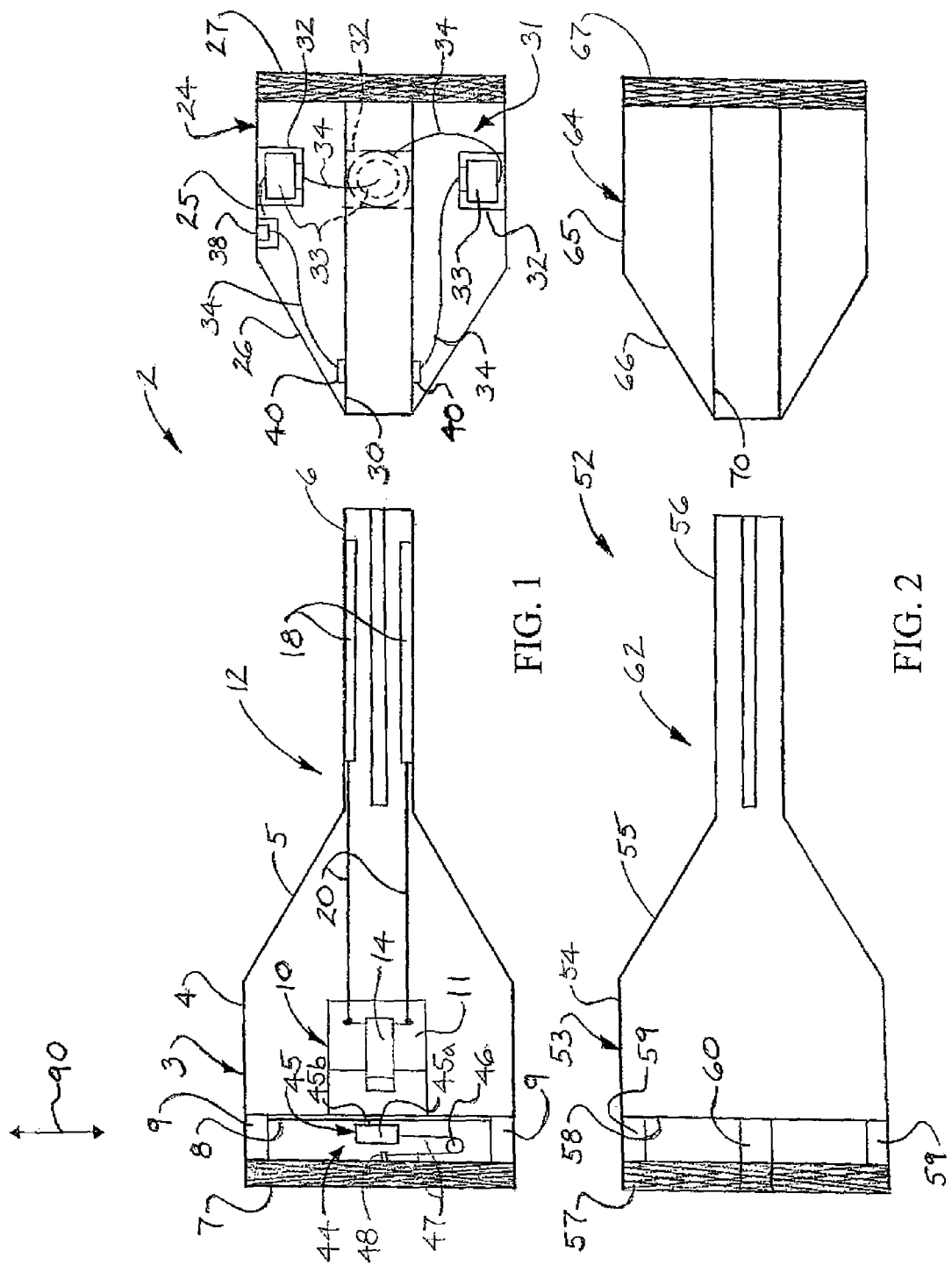
FIG. 1 is an exploded side view of a typical emitting unit of an illustrative embodiment of the flange bolt alignment systems.
FIG. 2 is an exploded side view of a typical receiving unit of an illustrative embodiment of the flange bolt alignment systems.

As illustrated in FIGS. 1 and 3, the emitting unit 2 of the system 1 may include an emitting unit head 3 and an emitting unit tail 24 which is detachably attached to the emitting unit head 3. The emitting unit head 3 and the emitting unit tail 24 may include an emitting unit housing 12. The emitting unit head 3 portion of the emitting unit housing 12 may include an emitting unit head housing 4 which may be generally cylindrical. A tapered emitting unit head neck 5 may extend from the emitting unit head housing 4. A generally elongated emitting unit head shaft 6 may extend from the emitting unit head neck 5. The emitting unit head housing 4 may have an emitting unit head end panel 7 which is opposite the emitting unit head shaft 6. A beam reflecting assembly compartment 8 may be provided in the emitting unit head housing 4. The beam reflecting assembly compartment 8 may have a transparent compartment wall 9.

The emitting unit tail 24 portion of the emitting unit housing 12 may include an emitting unit tail housing 25 which may be generally cylindrical. A tapered emitting unit tail neck 26 may extend from the emitting unit tail housing 25. The emitting unit tail housing 25 may have an emitting unit tail end panel 27. An emitting unit shaft cavity 30 may extend into the emitting unit tail neck 26. The emitting unit shaft cavity 30 may be sized and shaped to accommodate the emitting unit head shaft 6 of the emitting unit head 3 in detachable attachment of the emitting unit tail 24 to the emitting unit head 3, as will be hereinafter described.

A beam emitting assembly 10 may be provided in the emitting unit head 3 and the emitting unit tail 24 of the emitting unit 2. The beam emitting assembly 10 may include a beam emitting device socket 11 which is provided in the emitting unit head housing 4. A beam emitting device 14 may be disposed in electrical contact with the beam emitting device socket 11. The beam emitting device 14 may include any type of device which is capable of emitting an incident light beam 49 (FIG. 3). For example and without limitation, in some embodiments, the beam emitting device 14 may include a laser-emitting device.

A pair of beam emitting device contacts 18 may be provided on an exterior surface of the housing shaft 6 of the emitting unit head 3. The beam emitting device contacts 18 may be electrically connected to the beam emitting device socket 11 of the beam emitting assembly 10 through contact wiring 20. A pair of emitting unit tail contacts 40 may be provided in the emitting unit tail neck 26 of the emitting unit tail 24. The emitting unit tail contacts 40 may be exposed inside the emitting unit shaft cavity 30. At least one power source 31 may be electrically connected to the emitting unit tail contacts 40 such as through contact wiring 34. In some embodiments, the power source 31 may include at least one battery 33. Each battery 33 may be contained inside at least one battery compartment 32. Accordingly, upon insertion of the emitting unit head shaft 6 of the emitting unit head 3 into the emitting unit shaft cavity 30 in the emitting unit tail 24, the emitting unit head contacts 18 on the emitting unit head shaft 6 are disposed in electrical contact with the emitting unit tail contacts 40 in the emitting unit tail 24. Thus, electrical current flows from the power source 31 through the contact wiring 34, the emitting unit tail contacts 40, the emitting unit head contacts 18 and the contact wiring 20, respectively, to the beam emitting device socket 11. The beam emitting device 14 emits an incident light beam 49 (FIG. 3) for purposes which will be hereinafter described. A switch 38 may be electrically connected between the power source 31 and the emitting unit tail contacts 40 typically through the contact wiring 34 to selectively energize and de-energize the beam emitting device 14. The switch 38 may be provided on an exterior surface of the emitting unit tail housing 25 or in any other accessible location on the emitting unit tail 24.

As illustrated in FIGS. 1, 3, 3A and 3B, a beam reflecting assembly 44 may be provided in the beam reflecting assembly compartment 8 of the emitting unit head housing 4. The beam reflecting assembly 44 may include a beam reflecting element 45 which is disposed in the path of the incident light beam 49 (FIG. 3) emitted from the beam emitting device 14. The beam reflecting element 45 may be any type of light-reflecting device or component which reflects the incident light beam 49 to the reflected light beam 50 such that the reflected light beam 50 exits the emitting unit head 3 through the compartment wall 9 along the horizontal axis 91 and typically in perpendicular relationship to a longitudinal axis of the emitting unit 2. An example of a suitable device or component which may be suitable for the beam reflecting element 45 includes a prism. The beam reflecting element 45 may have any design which is suitable for the purpose. As particularly illustrated in FIGS. 3A and 3B, in some embodiments, the beam reflecting element 45 may be generally triangular in top view with a light-reflecting surface 45a which is disposed at a 45-degree angle to the path of the incident light beam 49. Upon impingement of the incident light beam 49 on the light-reflecting surface 45a, the reflected light beam 50 is reflected at a 90-degree angle to the incident light beam 49 and exits the emitting unit head housing 4 through the compartment wall 9.

Figure 3B:
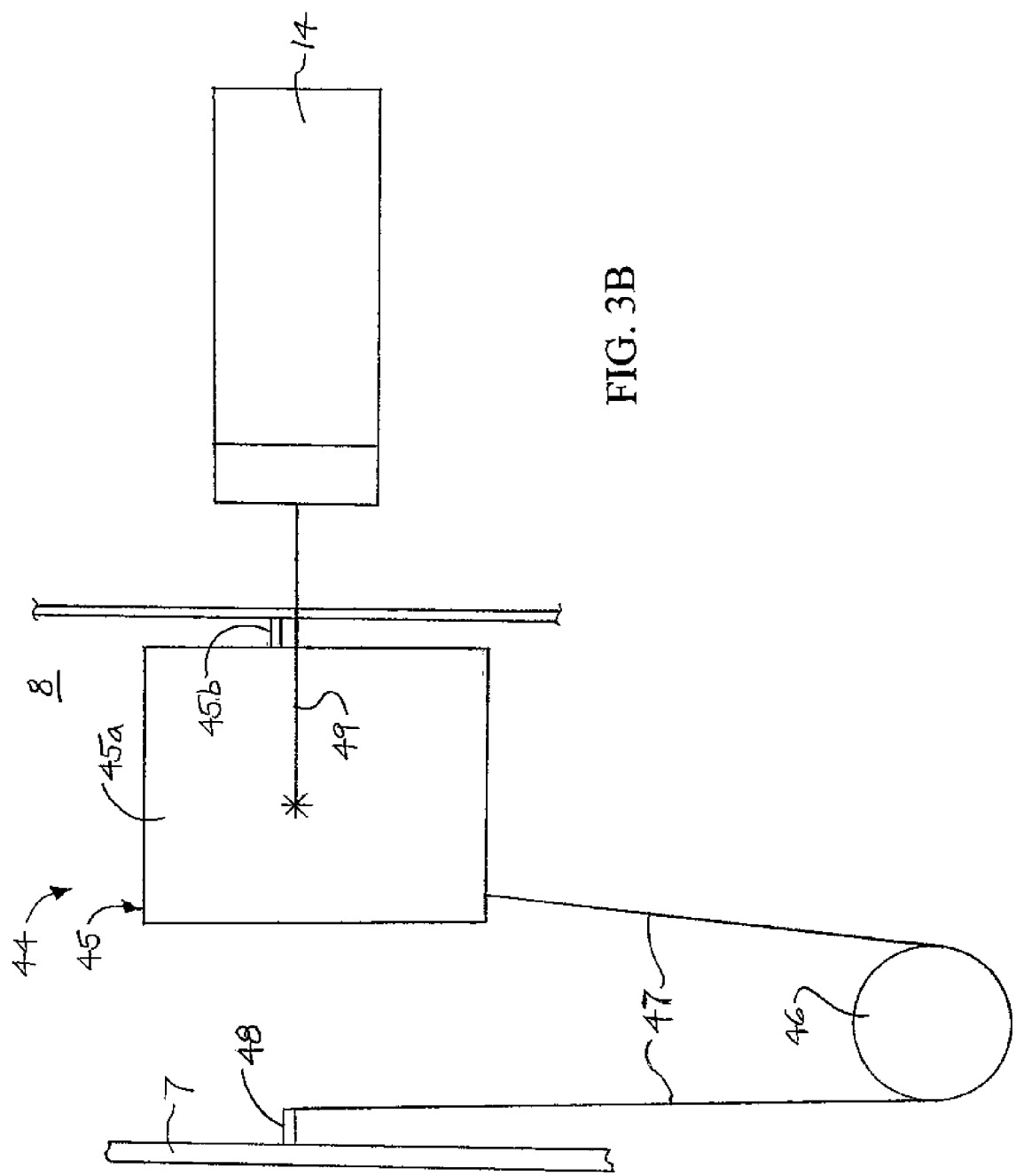
FIG. 3B is a side view of a typical beam reflecting assembly of an illustrative embodiment of the flange bolt alignment systems in typical application of the systems.

The beam reflecting element 45 may be pivotally mounted in the beam reflecting assembly compartment 8 such as via an element mounting pin 45b. The element mounting pin 45b may attach to the beam reflecting element 45 above the center of gravity of the beam reflecting element 45. Thus, the beam reflecting element 45 is continually oriented along a vertical axis 90 (FIG. 1) by gravity irrespective of the rotational position of the emitting unit 2. Therefore, the reflected light beam 50 is transmitted from the emitting unit head 3 of the emitting unit 2 along the horizontal axis 91 (FIG. 3) irrespective of the rotational position of the emitting unit 2. As illustrated in FIGS. 1 and 3B, in some embodiments, a counterweight 46 may be suspended from the beam reflecting element 45. A counterweight support line 47 may be attached to the beam reflecting element 45 and to the emitting unit head end panel 7 via a counterweight support line attachment 48. The counterweight 46 may be attached to the counterweight support line 47 according to the knowledge of those skilled in the art. Thus, the counterweight 46 may ensure that the beam reflecting element 45 is always oriented along the vertical axis 90 (FIG. 1) by gravity such that the reflected light beam 50 is transmitted from the emitting unit head 3 only along the horizontal axis 91 (FIG. 3).

As illustrated in FIGS. 2 and 3, the receiving unit 52 of the system 1 may include a receiving unit head 53 and a receiving unit tail 64 which detachably engages the receiving unit head 53. The receiving unit head 53 and the receiving unit tail 64 may include a receiving unit housing 62. The receiving unit head 53 portion of the receiving unit housing 62 may include a receiving unit head housing 54 which may be generally cylindrical. A tapered receiving unit head neck 55 may extend from the receiving unit head housing 54. A generally elongated receiving unit head shaft 56 may extend from the receiving unit head neck 55. The receiving unit head housing 54 may have a receiving unit housing end panel 57 which is opposite the receiving unit head shaft 56. A light diffuser compartment 58 may be provided in the receiving unit head 53. The light diffuser compartment 58 may have a transparent compartment wall 59. A light diffusing element 60 may be provided in the light diffuser compartment 58. The light diffusing element 60 may be any type of material which diffuses light upon impingement of the reflected light beam 50 on the light diffusing element 60. Materials which are suitable for the light diffusing element 60 include glass and plastic, for example and without limitation.

The receiving unit tail 64 portion of the receiving unit housing 62 may include a receiving unit tail housing 65 which may be generally cylindrical. A tapered receiving unit tail neck 66 may extend from the receiving unit tail housing 65. The receiving unit tail housing 65 may have a receiving unit tail end panel 67. A receiving unit shaft cavity 70 (FIG. 2) may extend into the receiving unit tail neck 66. The receiving unit shaft cavity 70 may be sized and shaped to accommodate the receiving unit shaft 56 of the receiving unit head 53 in detachable attachment of the receiving unit tail 64 to the receiving unit head 53, as will be hereinafter described.

Referring again to FIGS. 3-7 of the drawings, in typical application, the system 1 facilitates alignment of the first set of bolt openings 76 in the first conduit flange 75 on the first conduit 74 with the second set of bolt openings 82 (FIGS. 6 and 7) in the second conduit flange 81 on the second conduit 80 for insertion of the flange bolts 86 through the registering first and second sets of bolt openings 76, 82, respectively, and coupling of the second conduit 80 to the first conduit 74. As illustrated in FIG. 3, the emitting unit 2 and the receiving unit 52 may initially be installed in an adjacent pair, respectively, of the first set of bolt openings 76 in the first conduit flange 75 on the first conduit 74. Installation of the emitting unit 2 in the first one of the adjacent bolt openings 76 may be accomplished by initially inserting the emitting unit head shaft 6 on the emitting unit head 3 of the emitting unit 2 through the first one of the first conduit bolt openings 76 and then inserting the emitting unit head shaft 6 into the emitting unit shaft cavity 30 in the emitting unit tail 24. Thus, the power source 31 in the emitting unit tail 24 is disposed in electrical communication with the beam emitting device 14 in the emitting unit head 2 typically through the contact wiring 34, the emitting unit tail contacts 40, the emitting unit head contacts 18, the contact wiring 20 and the beam emitting device socket 11, respectively, of the beam emitting assembly 10. In some embodiments, the beam emitting device 14 may be selectively energized to emit the incident light beam 49 typically by actuation of the switch 38. Installation of the receiving unit 52 in the second one of the adjacent bolt openings 76 may be accomplished by initially inserting the receiving unit head shaft 56 on the receiving unit head 53 of the receiving unit 52 through the second one of the first conduit bolt openings 76 and then inserting the receiving unit head shaft 56 into the receiving unit shaft cavity 70 in the receiving unit tail 64. As illustrated in FIG. 3, the receiving unit 52 is thusly disposed in adjacent and spaced-apart relationship to the emitting unit 2 with the beam reflecting element 45 of the beam reflecting assembly 44 in the emitting unit 2 adjacent to the light diffusing element 60 in the receiving unit head 53 of the receiving unit 52.

The rotational position of the first conduit 74 may initially be manually adjusted in an attempt to position the pair of adjacent first conduit flange bolt openings 76 in the horizontal plane 98 (FIG. 4) as closely as possible. The system 1 is then operated to determine whether the pair of adjacent first conduit flange bolt openings 76 are disposed in the horizontal plane 98. Accordingly, the switch 38 (FIG. 1) may be manipulated to establish flow of electrical current from the power source 31 to the beam emitting device 14 in the emitting unit head 3 of the emitting unit 2. The beam emitting device 14 emits the incident light beam 49, which impinges on the light reflecting surface 45a of the beam reflecting element 45. The reflected light beam 50 is transmitted from the emitting unit head 3 along the horizontal axis 91 (FIG. 3).

As illustrated in FIG. 4, in the event that the adjacent pair of the first set of bolt openings 76 is properly disposed in the horizontal plane 98, the light diffusing element 60 of the receiving unit 52 lies in the path of the reflected light beam 50 emitted from the emitting unit 2. Thus, the reflected light beam 50 impinges on the light diffusing element 60 in the receiving unit head 53 of the receiving unit 52, as illustrated in FIGS. 3 and 4, and diffuses the light to indicate the horizontal position of the adjacent pair of the first set of bolt openings 76. As illustrated in FIG. 5, in the event that the adjacent pair of the first set of bolt openings 76 is not properly disposed in the horizontal plane 98, the reflected light beam 50 misses the receiving unit 52 due to the continual orientation of the beam reflecting element 45 along the vertical axis 90 and thus, the transmission of the reflected light beam 50 along the horizontal axis 91. Thus, adjustments in the rotational position of the first conduit 74 can be made to orient the adjacent pair of the first set of bolt openings 76 until the reflected light beam 50 impinges on the light diffusing element 60, thus indicating that the adjacent pair of the first set of bolt openings 76 are disposed in the horizontal plane 98. After the second conduit 80 is aligned with the first conduit 74, the foregoing procedure can be carried out with respect to the second conduit 80 (FIG. 6) such that an adjacent pair of the second set of bolt openings 82 in the second conduit flange 81 on the second conduit 80 are oriented in the horizontal plane 98 and the second set of bolt openings 82 is properly aligned or registered with the first set of bolt openings 76 on the first conduit 74. The flange bolts 86 can be inserted through the registering first and second set of bolt openings 76, 82, respectively, and typically secured with nuts 87 to couple the second conduit 80 to the first conduit 74.

Figure 8:
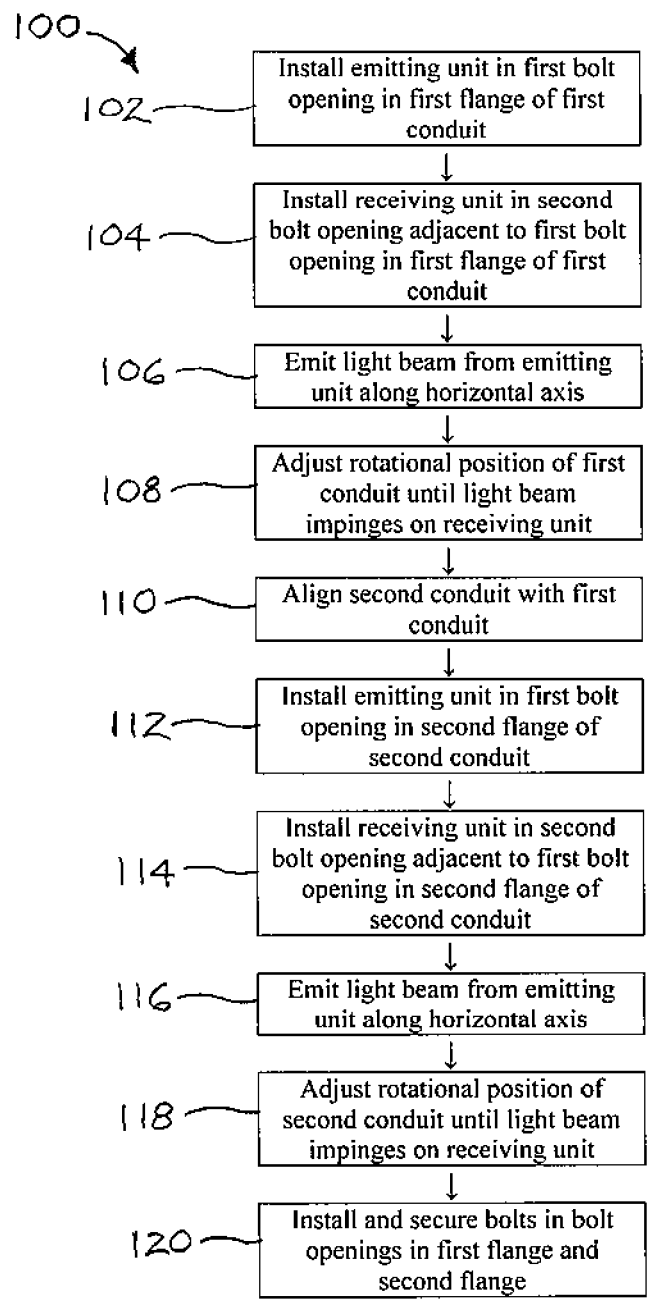
FIG. 8 is a flow diagram of an illustrative embodiment of the flange bolt alignment methods.

Referring next to FIG. 8 of the drawings, a flow diagram 100 of an illustrative embodiment of the flange bolt alignment methods is illustrated. At block 102, an emitting unit of a flange bolt alignment system may be installed in a first bolt opening in a first flange of a first conduit. At block 104, a receiving unit of the flange bolt alignment system may be installed in a second bolt opening adjacent to the first bolt opening in the first flange of the first conduit. At block 106, a light beam may be emitted from the emitting unit along a horizontal axis and typically in perpendicular relationship to a longitudinal axis of the emitting unit. At block 108, the rotational position of the first conduit may be adjusted until the light beam impinges on the receiving unit.

At block 110, a second conduit may be aligned with the first conduit. At block 112, the emitting unit of the flange bolt alignment system may be installed in a first bolt opening in a second flange of the second conduit. At block 114, the receiving unit of the flange bolt alignment system may be installed in a second bolt opening adjacent to the first bolt opening in the second flange of the second conduit. At block 116, a light beam may be emitted from the emitting unit along a horizontal axis and typically in perpendicular relationship to a longitudinal axis of the emitting unit. At block 118, the rotational position of the second conduit may be adjusted until the light beam impinges on the receiving unit. At block 120, bolts may be installed and secured in the registering bolt openings in the first flange on the first conduit and the second flange on the second conduit, respectively, to couple the second conduit to the first conduit.

Figure 9:
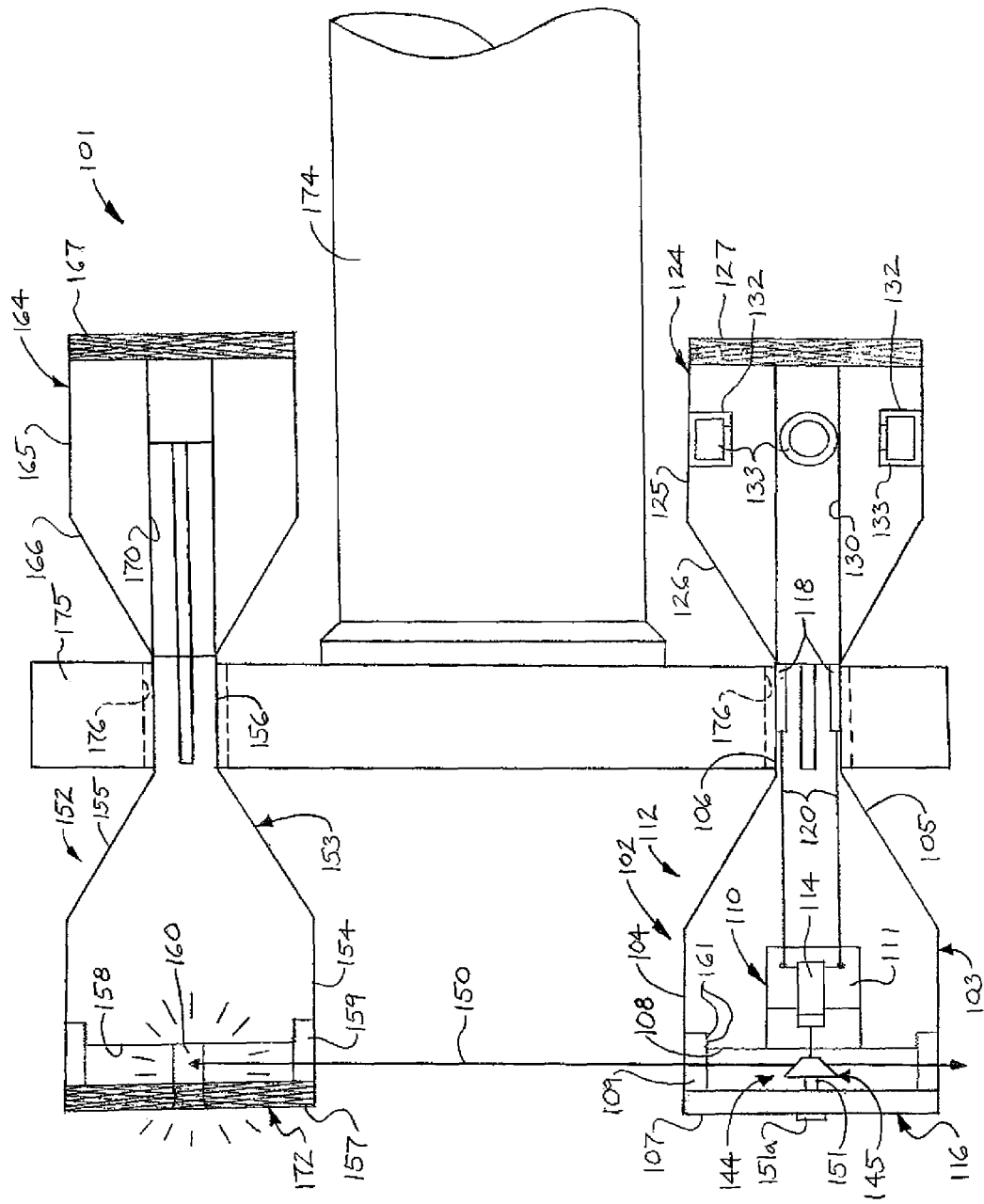
FIG. 9 is a top view of an alternative illustrative embodiment of the flange bolt alignment systems in typical application of the systems.
Figure 10A:
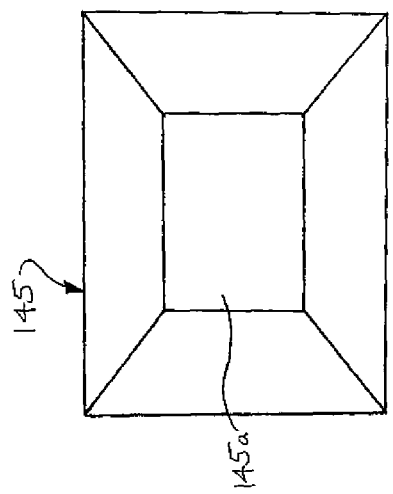
FIG. 10A is a front view of a typical beam reflecting element of the illustrative flange bolt alignment system illustrated in FIG. 9.
Figure 10:
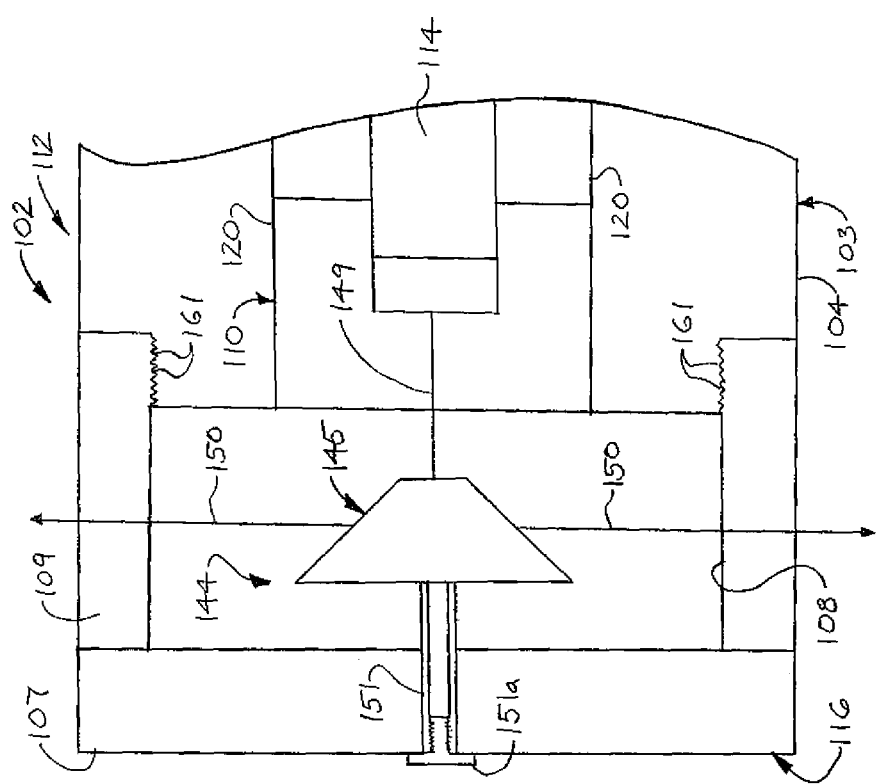
FIG. 10 is a top view of a typical beam reflecting assembly of the illustrative flange bolt alignment system illustrated in FIG. 9, in typical application of the system.
Figure 11:
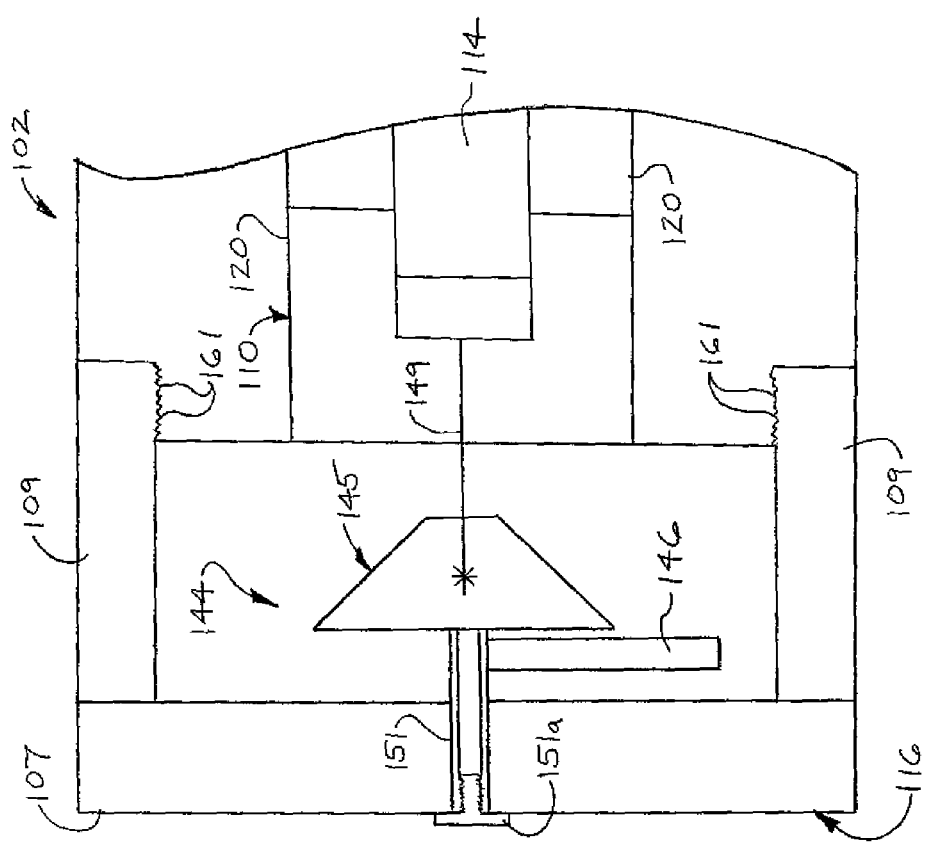
FIG. 11 is a side view of a typical beam reflecting assembly of the illustrative flange bolt alignment system illustrated in FIG. 9, in typical application of the system.

Referring next to FIGS. 9-11 of the drawings, an alternative illustrative embodiment of the flange bolt alignment systems is generally indicated by reference numeral 101 in FIG. 9. In the system 101, elements which are analogous to the respective elements of the assembly 1 that was heretofore described with respect to FIGS. 1-7 are designated by the same numeral in the 101-199 series in FIGS. 9-11. The emitting unit head end panel 107 and the compartment wall 109 may be component parts of an emitting unit head cap 116 which detachably engages the emitting unit head 103 typically at a set of threads 161. Accordingly, the emitting unit head cap 116 can be selectively detached from the emitting unit head 103 of the emitting unit 102 to facilitate maintenance and repair or replacement of the interior components of the emitting unit head 103 such as the beam emitting assembly 110 and the beam reflecting assembly 144. In some embodiments, the receiving unit head end panel 157 and the compartment wall 159 may be component parts of a receiving unit head cap 172 which detachably engages the receiving unit head 153 typically at a set of threads (not illustrated). Accordingly, the receiving unit head cap 172 can be selectively detached from the receiving unit head 153 of the receiving unit 152 to facilitate maintenance and repair or replacement of the interior components of the receiving unit head 153 such as the light diffusing element 160.

As illustrated in FIGS. 10 and 11, in some embodiments, the beam reflecting element 145 may be secured to the emitting unit head end panel 107 inside the beam reflecting assembly compartment 108 by threading an assembly mount bolt 151a in an assembly mount tube 151 which extends through a tube opening (not illustrated) in the emitting unit head end panel 107. The beam reflecting element 145 may be mounted on the assembly mount tube 151 inside the beam reflecting assembly compartment 108.

As illustrated in FIGS. 9 and 10, operation of the system 101 may be as was heretofore described with respect to operation of the system 1 in FIGS. 1-7. The beam reflecting assembly 145 may be capable of receiving the incident light beam 149 emitted by the beam emitting device 114 of the beam emitting assembly 110 and reflecting a pair of reflected light beams 150 from opposite sides of the emitting unit head 103 generally perpendicular to a long axis of the emitting unit 102 and along a horizontal axis 191 (FIG. 10). Accordingly, the emitting unit 102 can be placed on either side of the adjacent receiving unit 152 since the reflected light beams 150 emerge from both sides of the emitting unit head 103 of the emitting unit 102. This may facilitate ease in use of the system 101.

While illustrative embodiments of the disclosure have been described above, it will be recognized and understood that various modifications can be made and the appended claims are intended to cover all such modifications which may fall within the spirit and scope of the disclosure.

What is claimed is:

1. A flange bolt alignment system, comprising:
   an emitting unit including:
   an emitting unit housing;
   a beam emitting assembly in the emitting unit housing, the beam emitting assembly having:
   a beam emitting device adapted to emit an incident light beam; and
   at least one power source electrically connected to the beam emitting device; and
   a beam reflecting assembly in the emitting unit housing, the beam reflecting assembly having:
   a beam reflecting element pivotally carried by the emitting unit housing and continually oriented along a vertical axis by gravity; and
   a light reflecting surface on the beam reflecting element, the light reflecting surface positioned to receive the incident light beam and reflect a reflected light beam from the emitting unit housing along a horizontal axis; and
   a receiving unit adapted for positioning in adjacent, spaced-apart relationship to the emitting unit, the receiving unit including:
   a receiving unit housing; and
   a light diffusing element in the receiving unit housing.

2. The flange bolt alignment system of claim 1 wherein the beam emitting device comprises a laser-emitting device.

3. The flange bolt alignment system of claim 1 wherein the emitting unit comprises an emitting unit head and an emitting unit tail detachably carried by the emitting unit head.

4. The flange bolt alignment system of claim 3 wherein the emitting unit head comprises a generally cylindrical emitting unit head housing, a tapered emitting unit head neck extending from the emitting unit head housing and an elongated emitting unit head shaft extending from the emitting unit head neck.

5. The flange bolt alignment system of claim 4 wherein the emitting unit tail comprises a generally cylindrical emitting unit tail housing, a tapered emitting unit tail neck extending from the emitting unit tail housing and an emitting unit shaft cavity in the emitting unit tail neck and receiving the emitting unit head shaft of the emitting unit head.

6. The flange bolt alignment system of claim 1 wherein the receiving unit comprises a receiving unit head and a receiving unit tail detachably carried by the receiving unit head.

7. The flange bolt alignment system of claim 6 wherein the receiving unit head comprises a generally cylindrical receiving unit head housing, a tapered receiving unit head neck extending from the receiving unit head housing and an elongated receiving unit head shaft extending from the receiving unit head neck.

8. The flange bolt alignment system of claim 7 wherein the receiving unit tail comprises a generally cylindrical receiving unit tail housing, a tapered receiving unit tail neck extending from the receiving unit tail housing and a receiving unit shaft cavity in the receiving unit tail neck and receiving the receiving unit head shaft of the receiving unit head.

9. A flange bolt alignment system, comprising:
an emitting unit including:
an emitting unit housing;
a beam emitting assembly in the emitting unit housing, the beam emitting assembly having:
a beam emitting device adapted to emit an incident light beam; and
at least one power source electrically connected to the beam emitting device; and
a beam reflecting assembly in the emitting unit housing, the beam reflecting assembly having:
a beam reflecting element pivotally carried by the emitting unit housing and continually oriented along a vertical axis by gravity;
a light reflecting surface on the beam reflecting element, the light reflecting surface positioned to receive the incident light beam and reflect a reflected light beam from the emitting unit housing along a horizontal axis; and
a counterweight carried by the beam reflecting element; and
a receiving unit adapted for positioning in adjacent, spaced-apart relationship to the emitting unit, the receiving unit including:
a receiving unit housing; and
a light diffusing element in the receiving unit housing.

10. The flange bolt alignment system of claim 9 wherein the beam emitting device comprises a laser-emitting device.

11. The flange bolt alignment system of claim 9 wherein the emitting unit comprises an emitting unit head and an emitting unit tail detachably carried by the emitting unit head.

12. The flange bolt alignment system of claim 11 wherein the emitting unit head comprises a generally cylindrical emitting unit head housing, a tapered emitting unit head neck extending from the emitting unit head housing and an elongated emitting unit head shaft extending from the emitting unit head neck.

13. The flange bolt alignment system of claim 12 wherein the emitting unit tail comprises a generally cylindrical emitting unit tail housing, a tapered emitting unit tail neck extending from the emitting unit tail housing and an emitting unit shaft cavity in the emitting unit tail neck and receiving the emitting unit head shaft of the emitting unit head.

14. The flange bolt alignment system of claim 9 wherein the receiving unit comprises a receiving unit head and a receiving unit tail detachably carried by the receiving unit head.

15. The flange bolt alignment system of claim 14 wherein the receiving unit head comprises a generally cylindrical receiving unit head housing, a tapered receiving unit head neck extending from the receiving unit head housing and an elongated receiving unit head shaft extending from the receiving unit head neck.

16. The flange bolt alignment system of claim 15 wherein the receiving unit tail comprises a generally cylindrical receiving unit tail housing, a tapered receiving unit tail neck extending from the receiving unit tail housing and a receiving unit shaft cavity in the receiving unit tail neck and receiving the receiving unit head shaft of the receiving unit head.

17. A flange bolt alignment system, comprising:
an emitting unit including:
an emitting unit head having:
a generally cylindrical emitting unit head housing;
a tapered emitting unit head neck extending from the emitting unit head housing; and
an emitting unit head shaft extending from the emitting unit head neck;
an emitting unit tail detachably carried by the emitting unit head, the emitting unit tail having:
a generally cylindrical emitting unit tail housing;
a tapered emitting unit tail neck extending from the emitting unit tail housing; and
an emitting unit shaft cavity in the emitting unit tail neck, the emitting unit shaft cavity detachably receiving the emitting unit head shaft of the emitting unit head;
a beam emitting assembly including:
a beam emitting device in the emitting unit head housing of the emitting unit head, the beam emitting device adapted to emit an incident light beam;
a plurality of emitting unit head contacts carried by the emitting unit head shaft of the emitting unit head, the emitting unit head contacts disposed in electrical communication with the beam emitting device;
at least one power source in the emitting unit tail housing of the emitting unit tail; and
a plurality of emitting unit tail contacts carried by the emitting unit tail neck of the emitting unit tail, the plurality of emitting unit tail contacts disposed in electrical contact with the emitting unit head contacts when the emitting unit head shaft of the emitting unit head is inserted in the emitting unit shaft cavity of the emitting unit tail; and
a beam reflecting assembly in the emitting unit head, the beam reflecting assembly having:
a beam reflecting element pivotally carried by the emitting unit housing and continually oriented along a vertical axis by gravity;
a light reflecting surface on the beam reflecting element, the light reflecting surface positioned to receive the incident light beam and reflect a reflected light beam from the emitting unit housing along a horizontal axis; and a counterweight carried by the beam reflecting element; and a receiving unit adapted for positioning in adjacent, spaced-apart relationship to the emitting unit, the receiving unit including:

a receiving unit head having:
- a generally cylindrical receiving unit head housing;
- a light diffusing element in the receiving unit head housing;
- a tapered receiving unit head neck extending from the receiving unit head housing; and
- a receiving unit head shaft extending from the receiving unit head neck;

a receiving unit tail detachably carried by the receiving unit head, the receiving unit tail having:
- a generally cylindrical receiving unit tail housing;
- a tapered receiving unit tail neck extending from the receiving unit tail housing; and
- a receiving unit shaft cavity in the receiving unit tail neck, the receiving unit shaft cavity detachably receiving the receiving unit head shaft of the receiving unit head.

18. The flange bolt alignment system of claim 17 wherein the beam emitting device comprises a laser-emitting device.

19. The flange bolt alignment system of claim 17 wherein the at least one power source comprises a plurality of batteries.

20. The flange bolt alignment system of claim 17 further comprising a switch carried by the emitting unit tail of the emitting unit, the switch electrically connected between the at least one power source and the plurality of emitting unit tail contacts.

21. A flange bolt alignment method, comprising:

installing an emitting unit in a first bolt opening in a first flange of a first conduit;

installing a receiving unit in a second bolt opening adjacent to the first bolt opening in the first flange of the first conduit;

emitting a light beam from the emitting unit along a horizontal axis;

adjusting a rotational position of the first conduit until the light beam impinges on the receiving unit;

aligning a second conduit with the first conduit;

installing a receiving unit in a first bolt opening in a second flange of the second conduit;

installing a receiving unit in a second bolt opening adjacent to the first bolt opening in the second flange of the second conduit;

emitting a light beam from the emitting unit along a horizontal axis; and adjusting a rotational position of the second conduit until the light beam impinges on the receiving unit.

* * * * *